United States Patent [19]
Garcia

[11] 3,859,107
[45] Jan. 7, 1975

[54] METHOD OF SELECTIVELY STIMULATING OIL WELLS, COMPOSITIONS THEREFOR, AND METHODS OF MAKING SUCH COMPOSITIONS

[75] Inventor: Calixto Fortunato Garcia, Hurst, Tex.

[73] Assignee: Byron Jackson, Inc., Long Beach, Calif.

[22] Filed: July 24, 1972

[21] Appl. No.: 274,718

Related U.S. Application Data

[62] Division of Ser. No. 152,362, June 11, 1971, Pat. No. 3,719,228.

[52] U.S. Cl.............................. 106/123 TQ, 106/219
[51] Int. Cl............................................. C08h 15/02
[58] Field of Search........ 106/123 TQ, 219, 287 SS; 252/8.55 R; 166/281

[56] References Cited
UNITED STATES PATENTS

| | | | |
|---|---|---|---|
| 2,350,521 | 6/1944 | O'Neal | 106/219 X |
| 2,825,409 | 3/1958 | Ring | 252/8.55 R X |
| 3,009,820 | 11/1961 | Gould | 106/123 TQ |

Primary Examiner—Lewis T. Jacobs
Attorney, Agent, or Firm—John O. Evans, Jr.

[57] ABSTRACT

A method of treating an earth formation, especially a calcareous earth formation, containing petroleum and connate brine to stimulate production of the petroleum without substantially increasing the production of brine. A liquid preflush composition, including a water solution of polar solvent having dissolved in the solution rosin soap and fatty acid soap is injected into the formation. The preflush composition reacts with the connate brine to produce a precipitate that blocks the brine-bearing passages, but the preflush composition does not react with the petroleum to produce a precipitate. Thus, the petroleum bearing passages are left open. Thereafter, an acid solution or other treating solution is injected into the formation to selectively stimulate or treat the oil-bearing passages. Preflush concentrates and compositions for use in the formation-treating method are disclosed as well as processes of making such compositions.

4 Claims, No Drawings

METHOD OF SELECTIVELY STIMULATING OIL WELLS, COMPOSITIONS THEREFOR, AND METHODS OF MAKING SUCH COMPOSITIONS

This application is a division of application Ser. No. 152,362, filed June 11, 1971, now U.S. Pat. No. 3,719,228, issued Mar. 6, 1973.

BACKGROUND OF THE INVENTION

1. Field of the Invention

This invention relates to the treatment of earth formations, to compositions used in such treatment, and to the making of such compositions. More particularly, this invention relates to the acidizing of calcareous earth formations, including the pretreatment of such formations to selectively block the brine-bearing portions of the formation for substantially preventing the flow of acid solution into the brine-bearing portions, while permitting the acid solution to enter the petroleum-bearing portions for stimulating them.

2. Description of the Prior Art

U.S. Pat. No. 3,421,585, issued Jan. 14, 1969, discloses a liquid preflush composition for selectively blocking the water-bearing portion of an earth formation that also includes petroleum bearing portions, so that acid solution subsequently injected into the formation may enter the petroleum-bearing strata while being substantially excluded from the water-bearing strata. This preflush solution includes a liquid hydrocarbon, a fatty acid soap, and an agent for solubilizing the soap in the oil. This prior art preflush composition reacts with water in the formation to throw down a precipitate to substantially seal the pores of that part of the formation that contains water.

Other blocking compositions that selectively react with water or brine in the formation have been proposed.

Whereas, these known selective preflush blocking compositions have been employed with varying degrees of success, none of them is satisfactory in all respects.

SUMMARY OF THE INVENTION

An object of the invention is to provide a well or formation treating or acidizing process and a preflush solution for use therein that have improved characteristics over prior processes and solutions.

Another object of the invention is to provide a preflush solution for use in a well treating process that reacts with naturally occurring brine in the formation adjacent to the well to produce a precipitate having very desirable properties for selectively blocking the brine-containing strata of the formation while leaving the petroleum-bearing strata open.

Another object is to provide a process for making a preflush solution concentrate that can be diluted with water for use, and that will not become viscous or produce a precipitate when so diluted.

Certain of the foregoing and aims, objects and advantages of the invention, and others as may be set forth in or inferred from the following description, are realized in a method of treating an earth formation containing petroleum-bearing portions and brine-bearing portions, the formations being in communication with a well, which includes introducing into the well a liquid preflush composition comprising a solution of a polar solvent in water, the solution having dissolved therein rosin soap and fatty acid soap; forcing the preflush composition into the formation to react with brine in said brine-bearing portions to substantially seal the pores thereof; introducing into the well a formation-treating solution; and forcing the formation-treating solution into the formation.

Other aims, objects and advantages of the invention are achieved in a composition for injection into an earth formation containing petroleum and connate brine to selectively block the brine-bearing portions of the formation which includes a solution of a polar solvent in water and rosin soap and fatty acid soap dissolved in such solution.

Still other objects of the invention are attained in a process of making a concentrate for a preflush composition for introduction into an earth formation having petroleum-bearing strata and brine-bearing strata to block the brine-bearing strata which includes dissolving rosin and fatty acid in a polar solvent to form a solution, and adding a base to the solution to saponify the rosin and the fatty acid.

DESCRIPTION OF THE PREFERRED EMBODIMENTS

Liquid preflush compositions of the present invention include a carrier liquid or vehicle, including polar solvent and water, and rosin soap and fatty acid soap in solution in the vehicle. Such preflush compositions are conveniently made by preparing a concentrate which is then diluted with water to provide the preflush composition that is injected into the formation.

A desirable and recommended rosin soap for use in the present invention is one produced by neutralizing or saponifying Dymerex rosin acid with ammonium hydroxide. Dymerex rosin acid is a pale-colored, high softening-point, noncrystalline, thermoplastic resinous material consisting mainly of dimeric rosin acids. It is sold under the trademark Dymerex by Hercules Powder Company of Wilmington, Del. It is made by polymerizing refined wood rosin; the unpolymerized components of the Dymerex material are monomeric rosin acids and neutral material. A typical Dymerex material has a softening point of 152°C. by the Hercules Drop Method, and 141°C. by the A.S.T.M. ring and ball method, an acid number of 135, a saponification number of 145, an unsaponifiable material content of 8 percent, a gasoline insoluble material content of nil, a specific rotation of −25°C., a density of 1.069 g./ml. at 20°C., and a flash point of 250°C. by the Cleveland open cup method.

A suitable fatty acid soap in accordance with the invention is one produced by saponifying tall oil with ammonium hydroxide. Distilled tall oils available from Arizona Chemical Company, of New York, N.Y. and sold under the trademark Acintol are especially desirable. An especially desirable material is designated Acintol D29LR, which denotes a distilled tall oil that is a light-colored, distilled product containing fatty acids and about 29 percent of rosin acids. Another particularly useful desirable fatty acid component is designated Acintol D30E; it is a distilled tall oil, a brown mobile liquid typically containing 70 percent to 78 percent fatty acids and 20 percent to 28 percent rosin acids.

A typical Acintol D29LR distilled tall oil has an acid value of 190 and a saponification value of 193; it contains less than 0.1 percent moisture and less than 0.001 percent ash; it has a rosin acid content of 29 percent, a fatty acid content of 69 percent with unsaponifiables of 2 percent; it has a specific gravity (25°/25°C.) of 0.943, a flash point of 400°F., open cup, and a fire point of 440°F., open cup. The composition of the fatty acid portion of the distillate is 13 percent polyunsaturated, conjugated fatty acids, as linoleic acid, 29 percent polyunsaturated, non-conjugated fatty acids, as linoleic acid, 5 percent saturated fatty acids and 53 percent oleic acid, by difference.

The polar solvent advantageously employed in the invention is isopropyl alcohol (99 percent).

The water used in practicing the invention should be quite pure. Distilled water is theoretically ideal, but too costly. Ordinary city drinking water or fresh water is usually adequate. The water ought to contain less than about 500 p.p.m. of dissolved salts, and preferably less than 200 p.p.m.

As indicated hereinbefore, ammonium hydroxide (26°Be) is the preferred base for neutralizing the rosin acid and fatty acid components of the preflush solution.

Although the foregoing substances have been indicated to be preferred or desirable in the practice of this invention, other substances may be used instead, as will be described hereinafter.

EXAMPLE I

A preflush concentrate is prepared by dissolving 13.0 parts by weight of Dymerex rosin acid and 31.0 parts by weight of Acintol D30E distilled tall oil in 47.3 parts of by weight of 99 percent isopropyl alcohol. Dissolution of the materials is assisted by warming the alcohol and agitating it as the materials are added. To the solution so prepared is added 8.7 parts by weight of aqueous ammonium hydroxide (26°Be), which is sufficient to saponify the dissolved Dymerex and Acintol D30E and to raise the pH of the solution to about 9.5.

The alkaline solution so formed is essentially an alcoholic solution of ammonium soaps of rosin acids and ammonium soaps of fatty acids, but contains a small proportion of water. It is a clear concentrate. One volume of the concentrate may be diluted with from about two volumes up to about ten volumes of fresh or city water containing less than about 200 p.p.m. of dissolved salts to make preflush solutions in accordance with the invention. The diluted solutions remain clear, but upon mixing with connate brine that contains dissolved calcium and magnesium salts, a precipitate is immediately formed. This precipitate is a coprecipitated material composed mainly of the water-insoluble calcium and magnesium soaps of rosin acids and fatty acids. This coprecipitate is adhesive and pliable. It is insoluble in water but completely soluble in petroleum, kerosene, or similar oils. It starts to soften at a fairly high temperature of about 400°F. The properties make the coprecipitate a very efficacious temporary blocking material for the brine-bearing portions of the formation in the acidizing or other treatment of earth formations that contain both petroleum and brine.

The concentrates of the present invention have good keeping qualities; however, for improved storage life they should be maintained at a pH of from about 9 to about 10.

Preflush solutions according to the invention do not form a precipitate upon contact or mixing with oils, thus they will not block the oil-bearing strata of the formation.

Such preflush solutions do not produce a precipitate upon admixing with aqueous acid solutions. The acid will react with the alkaline soap converting resinous material back to its original acid form as a liquid droplet dispersion. When this reaction occurs within the oil-bearing rock matrix, a liquid resinous coating accumulates in the most permeable pathways and forces subsequent acid penetration to divert within the matrix into several paths of lower permeability.

The ultimate result is that the oil zone is penetrated more thoroughly without a noticeable injection pressure build-up, while salt water zones are isolated from acid stimulation.

Without the preflush solution acting as an internal diverting agent, acid will seek a path of least resistance and added acid penetration only serves to enlarge the same path. Even though acid may be penetrating into an oil zone the eventual oil production will be limited through the few enlarged channels made by the acid.

Core tests using the preflush fluid prior to any aqueous acid composition have substantiated that not only does acid preferentially penetrate an oil saturated core but that core is etched out by a multiple network of channels at the outlet side. This is in contrast to duplicate tests without preflush treatment wherein acid will normally penetrate the water-saturated core in preference to oil saturated zones and with etch out a limited number of channeled outlets, usually one or two.

The present preflush solutions have low viscosity enabling them to easily enter earth formations.

EXAMPLE II

Following the procedure described in Example I, 8.1 parts by weight of Dymerex rosin acid and 36.1 parts by weight of Acintol D29LR distilled tall oil were dissolved in 46.0 parts by weight of 99 percent isopropyl alcohol with heating and agitation. This solution was neutralized with 9.8 parts by weight of 26°Be. aqueous ammonium hydroxide. The final pH was about 9.3. The preflush concentrate so formed could be diluted with up to 10 volumes of fresh water per volume of concentrate without causing a precipitate to form. However, an adhesive and pliable coprecipitate was formed at once upon mixing brine from a limestone formation with preflush solution consisting of a 1 to 5 dilution of the concentrate with fresh water, this coprecipitate having properties very similar to those of the coprecipitate of Example I.

Rosin acids other than Dymerex rosin acids may be substituted in whole or in part for Dymerex rosin acids. Wood rosin, crude or refined, may be used, as well as gum rosin. Also suitable are the acids occurring in wood rosin and gum rosin, such as abietic acid, levopimaric acid, palustric acid, as well as the dimeric adducts of such acids. The dimers are somewhat more advantageous than the monomers because of their higher melting or softening points, higher molecular weights and greater acidity per molecule.

Fatty acids other than distilled tall oil fatty acids may be used. Refined tall oil fatty acids that contains 90 to 99 percent fatty acids and only a small percentage of rosin may be employed. Products available from Arizona Chemical Company under such trademarks as Acintol FA-1, Acintol FA-3 are suitable. Or, purified fatty acids, such as oleic acid, linoleic acid, palmitic acid, stearic acid, eicosadienoic acid, and mixtures of one or more of such purified fatty acids can be used. Fatty acids and soaps thereof, such as sodium or ammonium soaps, derived from animal or vegetable fats may also be employed.

It is not essential that isopropyl alcohol be employed to dissolve the rosin and fatty acids. Other alcohol such as ethyl alcohol or methyl alcohol will serve. Methyl alcohol may be used with isopropyl alcohol to provide a solvent for a preflush concentrate that is more sensitive to water than isopropyl alcohol alone. The foregoing alcohols are aliphatic alcohols containing from 1 to 3 carbon atoms. Other polar solvents such as glycol ethers may also be used, either by themselves or with suitable alcohols; the glycol ethers may be ethylene glycol ethyl ether or ethylene glycol methyl ether.

The base that is used for forming the soluble soaps of rosin and fatty acids in the polar solvent is not restricted to aqueous ammonium hydroxide. Other bases or mixtures thereof such as gaseous ammonia, ethylamine, thioethylamine or urea may be used; oil soluble organic bases of high molecular weight amines are not desired, as the preflush will become oil soluble and not responsive to brine. Aqueous sodium hydroxide or potassium hydroxide can also be employed.

The soluble rosin acid soaps and fatty acid soaps may be prepared in any manner and dissolved in the polar solvent to provide a preflush concentrate which may thereafter be diluted with water to provide preflush liquids.

Although the weight ratio of rosin acids to fatty acids employed may very considerably, such ratio may, with benefifical results, range between one part of rosin acid to two parts of fatty acids and one part of rosin acid to one-half part of fatty acid. In practice, the use of somewhat more fatty acid than rosin acid is generally desirable. In making the concentrate, approximately equal parts by weight of polar solvent and of the combined rosin acid and fatty acid are used; however, the ratio of vehicle to solids may be varied over a wide range without departing from the invention.

In field practice, the use of a spacer immediately ahead of and another spacer immediately following the preflush liquid and ahead of the acid or other treating liquid is recommended. Such spacers may be fresh water, or, in some instances, diesel oil or kerosene. The volume of the spacers may be roughly equivalent to the volume of 100 ft. of the production tubing in the well and enough to displace all fluids in the well below the bottom of the tubing. The use of the first spacer insures that the preflush will not prematurely contact brine in the well and produce an undesired precipitate in the bottom of the well proper. The second or following spacer is employed to insure separation of the preflush liquid from the acid solution that follows it. Diesel oil or kerosene may be used as spacers in formations having water-sensitive clays and in formations where no water is being produced.

The preflush liquids of the invention may contain additives such as inert or oil-soluble solid bridging materials, most advantageously where highly fractured formations are treated.

In diluting the concentrates of this invention with water to provide preflush solutions for injection into formations, the following guide lines will be helpful. Where the permeability of the formation is less than 15 millidarcies, one may use a preflush solution made by diluting one barrel (50 gallons) of concentrate prepared in accordance with Example I or Example II, hereinbefore, with 500 gallons of water to make 550 gallons of preflush liquid. For use in formations with permeabilities between 15 and 80 millidarcies, one barrel of such concentrate may be diluted with 250 gallons of water. Where the permeability is greater than 80 millidarcies, the dilution may be in the ratio of one barrel of concentrate to 150 gallons of water.

The amount of preflush liquid to be used will depend on the vertical extent of the zone to be treated and on the porosity of the formation. In general, a sufficient volume of preflush liquid should be used so that the formation treated is filled with the liquid for a radial distance of about two feet surrounding the well bore.

In acidizing an oil well, the following procedures may be followed. First, clean out the production tubing and the well below the packer and remove any scale or rust restrictions with acid. Then remove any spent acid or brine from the tubing and the well below the tubing, as by circulating water-free crude oil down the tubing and up the annulus surrounding the tubing. The well may be swabbed in low pressure reservoirs just prior to treatment. After the well has been cleaned, inject spacer fluid, such as fresh water, into the tubing in the calculated quantity, as discussed hereinbefore. Immediately behind the spacer, inject into the tubing a volume of preflush liquid calculated in accordance with the principles given hereinbefore. Immediately following the preflush liquid, inject into the tubing a second spacer of fresh water. Follow the second spacer with an acidizing liquid selected for its most beneficial effects as to concentration or composition from acids such as hydrochloric, hydrofluoric, phosphoric, formic or acetic. The acids may contain additives such as wetting agents, demulsifiers, inhibitors, scale preventers, chelating or buffering agents, organic solvents or solid bridging agents without limitation toward the scope of this invention. Aqueous hydrochloric acid solution of 18 percent acid concentration is a frequently used acidizing liquid. With a conventional displacing liquid, displace the injected fluids, including the acid, into the formation and allow the acid to act upon the formation. Ordinarily, the liquids will be injected below the pressure at which the formation would be fractured. After the acid has been held in contact with the formation for a time sufficient for it to react completely, the well may be put into production. Swabbing may be resorted to in low pressure reservoirs.

EXAMPLE III

A cased oil well having casing perforations running from a depth of 8532 ft. to 8552 ft. and housing a production packer set at 8400 ft. was producing 150 barrels of 35° A.P.I. gravity oil per day and 10 barrels of brine per day. The producing formation had a porosity of 14 percent and hydrochloric acid solubility of 95 percent. The bottom hole temperature was 160°F. This well was stimulated by injecting into the producing formation through the perforation a spearhead or spacer of 12 barrels of fresh water at 1,000 p.s.i. pressure. This was immediately followed by 12 barrels of preflush solution prepared by diluting one part of preflush concentrate made in accordance with the foregoing Example II with nine parts of fresh water and injected into the formation at a pressure of 1,500 p.s.i. The preflush solution was followed by a second spacer of 12 barrels of fresh water injected at 2,000 p.s.i. Thereafter, 1,000 gallons of 18 percent aqueous hydrochloric acid were injected into the formation at a pressure of 3,600 p.s.i.

Following the acid, 120 barrels of crude oil were injected into the formation at 1,700 p.s.i. Thereafter, the well was cleaned out and placed on production. The average production after the treatment was 408 barrels of oil per day with but a trace of brine.

The preflush liquid, when it contacts formation brine that contains dissolved calcium and magnesium salts, reacts with the brine to throw down a pliable and adhesive coprecipitate of calcium and magnesium soaps of rosin and fatty acids. This precipitate seals off the brine-bearing portions of the formation and diverts the acid into the petroleum bearing portions where it reacts with the formation to stimulate the production of petroleum. Although brines encountered in calcareous earth formations nearly always contain a sufficient concentration of magnesium and calcium ions to form a suitable precipitate with the preflush liquids, the invention is not limited to operations in calcareous formations, as silicious or other earth formations frequently contain connate brines that carry sufficient concentrations of calcium and magnesium ions to form desired precipitates with the preflush solutions.

The invention is not to be construed as limited to the particular forms disclosed herein, since these are to be regarded as illustrative rather than restrictive.

I claim:

1. A method of making a concentrate for a preflush composition for introduction into an earth formation having petroleum-bearing strata and brine-bearing strata to block said brine-bearing strata which comprises dissolving rosin and fatty acid in a polar solvent to form a solution, and adding a base to said solution to saponify said rosin and said fatty acid, said rosin being selected from the group consisting of wood rosin, gum rosin, acids occurring in wood rosin and gum rosin, the dimeric adducts of said acids, and mixtures thereof, said fatty acid being selected from the group consisting of tall oil fatty acids, oleic acid, linoleic acid, palmitic acid, stearic acid, eicosadienoic acid, and mixtures thereof, said base being selected from the group consisting of ammonia, ammonium hydroxide, alkali metal hydroxides, lower amines, urea, and mixtures thereof, said polar solvent being selected from the group consisting of aliphatic alcohols containing from 1 to 3 carbon atoms and glycol ethers, the weight ratio of the rosin acids to the fatty acids ranging between one part of rosin acids to two parts of fatty acids and one part of rosin acids to one-half part of fatty acids, there being a substantial amount of combined rosin acids and fatty acids in the concentrate.

2. A method as defined in claim 1 wherein said polar solvent is isopropyl alcohol, said rosin is dimerized rosin, and said fatty acid is distilled tall oil fatty acids.

3. A composition for injection into an earth formation containing petroleum and connate brine to selectively block the connate brine-bearing portions of the formation comprises:
   a. a solution of a polar solvent in water, said polar solvent being selected from the group consisting of aliphatic alcohols containing from 1 to 3 carbon atoms and glycol ethers; and
   b. rosin soap and fatty acid soap dissolved in said solution, said rosin soap being selected from the group consisting of the ammonium, alkali metal, lower amine, and urea soaps of a rosin, and mixtures thereof, said rosin being selected from the group consisting of wood rosin, gum rosin, acids occurring in wood rosin and gum rosin, the dimeric adducts of said acids, and mixtures thereof, said fatty acid soap being selected from the group consisting of the ammonium, alkali metal, lower amine, and urea soaps of a fatty acid, and mixtures thereof, said fatty acid being selected from the group consisting of tall oil fatty acids, oleic acid, linoleic acid, palmitic acid, stearic acid, eicosadienoic acid, and mixtures thereof;
   c. the weight ratio of the rosin acids to the fatty acids ranging between one part or rosin acids to two parts of fatty acids and one part of rosin acids to one-half part of fatty acids, there being a substantial amount of combined rosin acids and fatty acids in the composition.

4. A composition as defined in claim 3 wherein said polar solvent is isopropyl alcohol, said rosin soap is the ammonium soap of dimerized rosin acid, and said fatty acid soap is the ammonium salt of distilled tall oil fatty acids.

* * * * *